(No Model.)　　　　　　　　　　　　　　　　　3 Sheets—Sheet 1.
E. P. BROWNELL.
SPOOL MACHINE.

No. 409,665.　　　　　　　　　　　Patented Aug. 27, 1889.

Witnesses.
Chas. R. Burr
A. F. Stewart

Inventor.
Edwin P. Brownell
by Church & Church
his Attorneys.

(No Model.) 3 Sheets—Sheet 2.

E. P. BROWNELL.
SPOOL MACHINE.

No. 409,665. Patented Aug. 27, 1889.

Witnesses
Chas. R. Burr
A. J. Stewart

Inventor
Emerson P. Brownell
by Church & Church
his Attorneys (No Model.) 3 Sheets—Sheet 3.

E. P. BROWNELL.
SPOOL MACHINE.

No. 409,665. Patented Aug. 27, 1889.

Witnesses
Chas. R. Burr
A. J. S. Stuart

Inventor:
Emerson P. Brownell
by Church & Church
his Attorneys.

N. PETERS, Photo-Lithographer, Washington, D. C.

UNITED STATES PATENT OFFICE.

EMERSON P. BROWNELL, OF BEEBE PLAIN, QUEBEC, CANADA.

SPOOL-MACHINE.

SPECIFICATION forming part of Letters Patent No. 409,665, dated August 27, 1889.

Application filed March 17, 1888. Serial No. 267,521. (No model.)

*To all whom it may concern:*

Be it known that I, EMERSON P. BROWNELL, of Beebe Plain, Province of Quebec, Dominion of Canada, a subject of the Queen of Great Britain, have invented certain new and useful Improvements in Spool-Machines; and I do hereby declare the following to be a full, clear, and exact description of the same, reference being had to the accompanying drawings, forming a part of this specification, and to the figures and letters of reference marked thereon.

My invention has for its object to provide a machine for making spools from blanks in a more economical and expeditious manner than heretofore, and also one capable of producing spools rapidly in a shape that could not be given them by machines heretofore in use; and to these ends it consists in so constructing and arranging the various mechanisms and parts that the blanks are bored, faced, the ends shaped and embossed, and finally turned down to correct shape, and while it is preferable it is not essential that the operations be performed in the order named, nor by the particular mechanism described, as other arrangements and constructions could be devised without departing from the spirit of my invention; and it further consists in certain novelties of construction and combinations of parts, all as hereinafter fully described, and pointed out in the claims at the end of this specification.

Figure 1:
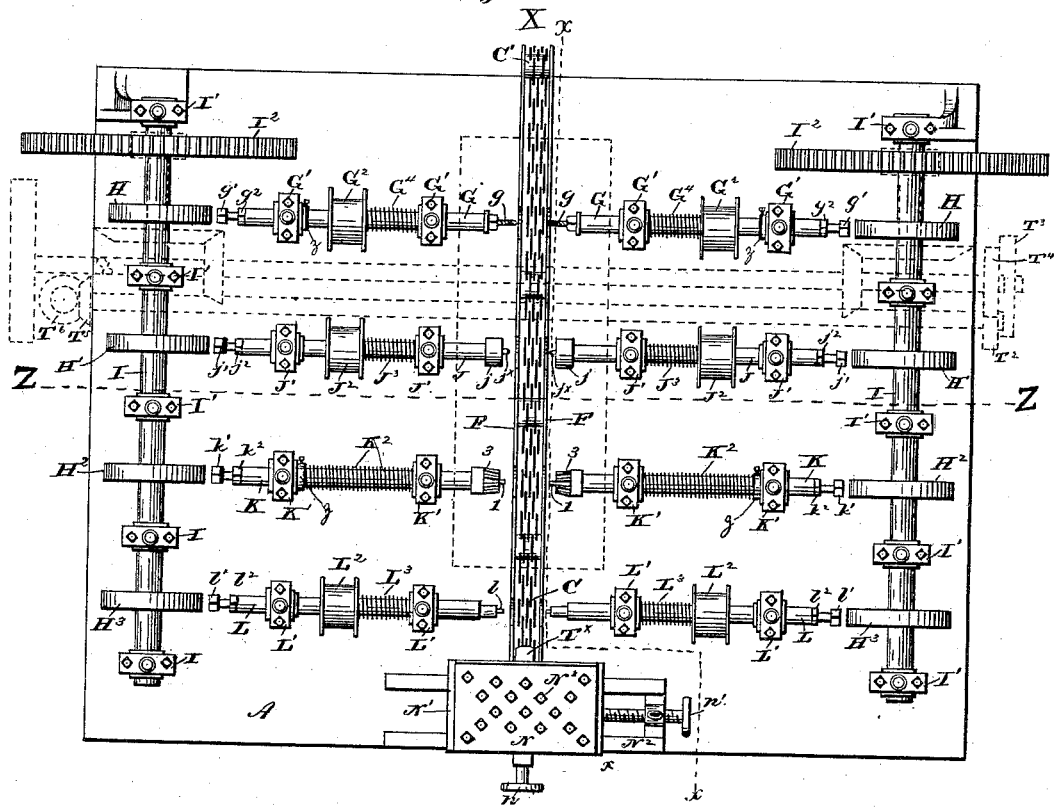
Figure 4:
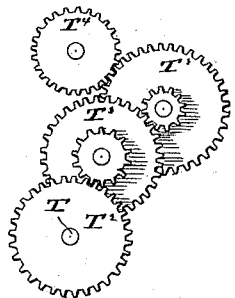
Figure 8:
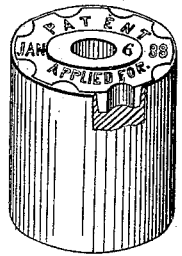
Figure 10:
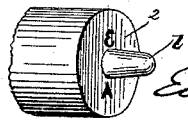
Figure 3:
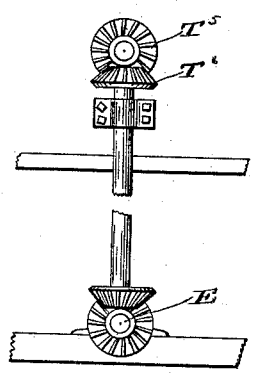
Figure 2:
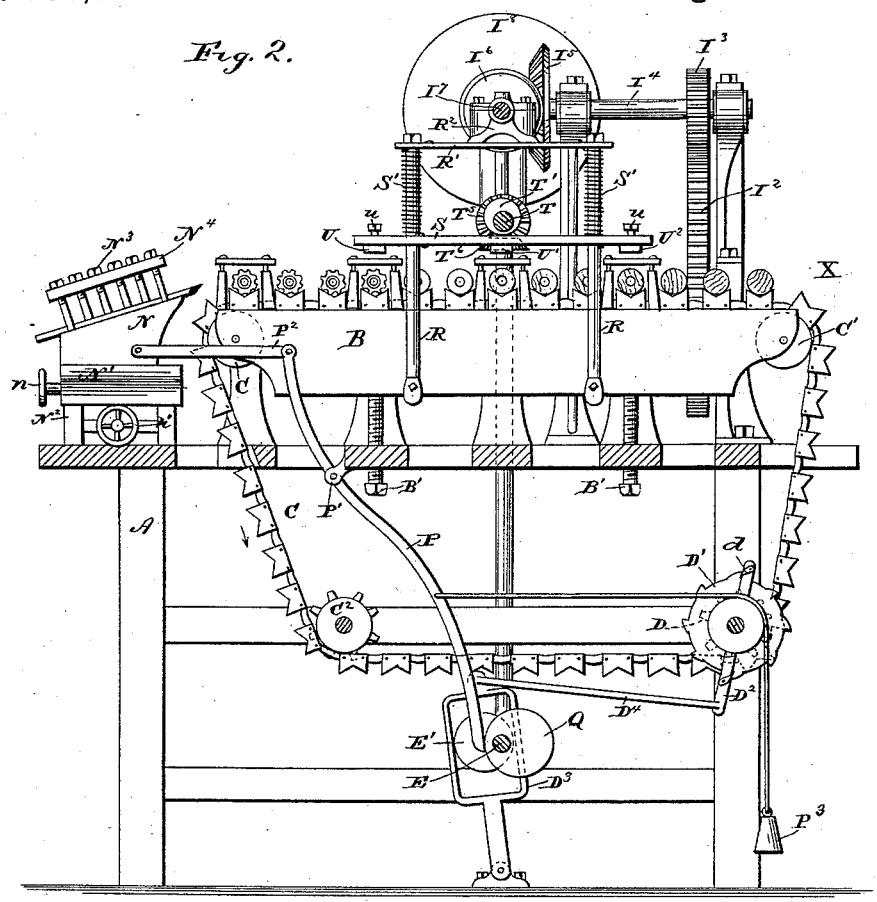
Figure 5:
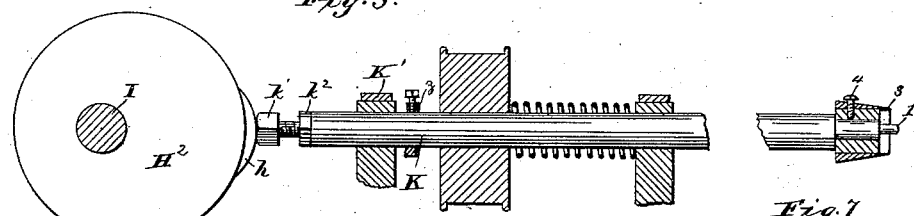
Figure 9:
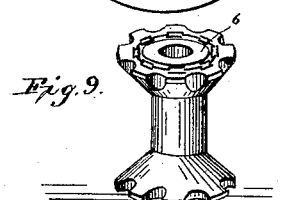
Figure 6:
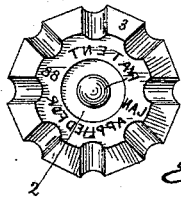
Figure 7:
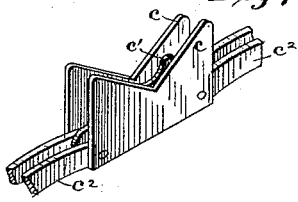
Figure 11:
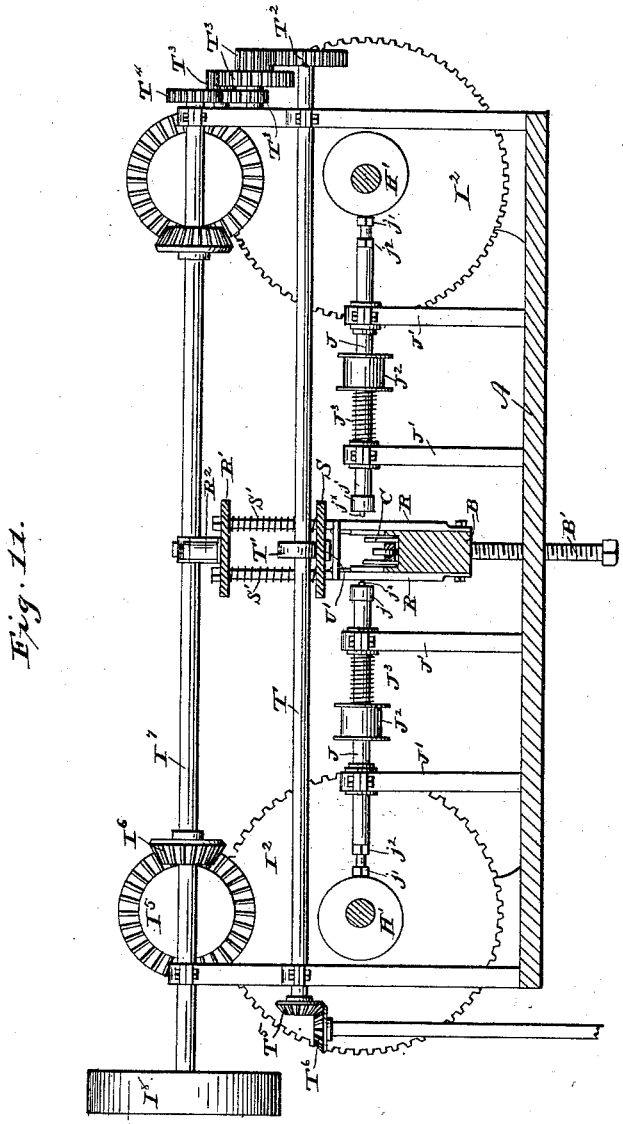

In the accompanying drawings, Figure 1 is a top plan view of a machine showing one form of device for carrying out my invention, with the blank-holding presser and operating mechanism indicated in dotted lines; Fig. 2, a sectional view on the line $x\,x$ of Fig. 1; Figs. 3 and 4, views of portions of opposite ends, showing the manner of gearing; Fig. 5, a sectional view of one of the end cutters and embossing-dies, with the operating-cam; Fig. 6, a front view of the cutting-knife and embossing-die; Fig. 7, a view of a portion of the blank-carrier; Fig. 8, a view of the blank, partly in section, after being cut and embossed; Fig. 9, a view of the opposite end of the complete spool; Fig. 10, a view of one of the holding-centers. Fig. 11 is a sectional view, taken on the line $Z\,Z$ of Fig. 1, showing the arrangement of the presser-operating device.

Similar letters of reference in the several figures indicate the same parts.

The construction and arrangement of the machine for carrying out my invention can be varied considerably, and that hereinafter described is but one embodiment. That, however, I prefer, as it combines simplicity and compactness, and the order in which the various operations are performed presents some advantages, hereinafter more fully described.

In the present machine the operative parts and mechanisms are supported upon a framework or support A, shown in the form of a table having a broad top over which the blanks are arranged to travel, so as to be operated upon by the various tools in succession. On the top of the table A is supported a supplemental plate or way B, adapted to be adjusted, when desired, by two (or more, if desired) adjusting-screws $B'\,B'$, passing through the table and entering the plate, as shown, and over this travels a blank support or carrier, in the present instance consisting of a sprocket-chain C, composed, preferably, of sections consisting of two pronged side sections $c\,c$ and an intermediate section $c'$, connected by smaller links $c^2$, the blank being adapted to rest between the prongs of the sections $c\,c$ and to be positively carried thereby when the chain is moved by suitable mechanism, and to serve also as stops, co-operating with a suitable clamping device to be described. The prongs on the sections $c\,c$, it will be noted, are inclined and the blank is adapted to rest in the lowest portion its diameter will permit, so that when blanks of greater or less diameter are operated upon their centers will all of them come in line with the center of the angle formed by these faces. This carrier passes longitudinally across the plate B and over flanged guide-wheels $C'\,C'$ at the ends, thence beneath the table and over suitable guide-wheel $C^2$, and is adapted to be driven intermittingly in the direction indicated by the arrow, Fig. 2, by any suitable driving mechanism. In the present instance this consists of a sprocket-wheel D, connected to a ratchet-wheel $D'$, and adapted to be driven by an arm $D^2$, carrying a pawl, said arm being oscillated by a pivoted frame $D^3$ (upon opposite sides of which cam $E'$ on shaft E acts) through a pitman $D^4$, as shown.

The operation of this device will now be understood. When the frame is moved on its pivot by the cam to the left, the pawl $d$ is moved over to engage the teeth of the wheel $D'$, and when moved in the opposite direction said pawl causes the wheel to turn and draw the chain forward a determinate distance, regulated by the excursion of the pawl and corresponding to the distance between the carrying-sections for the blanks.

Of course any other form of carrier could be devised as well as another form of mechanism for intermittingly operating it, and the details of this arrangement are not essential.

At the sides of the carrier-chain, where it passes across the plate B, are provided guide-plates F F, recessed at intervals, as shown, where the operating-tools are located, and separated from each other a distance just equal to the length of the blank, serving to guide the blank and prevent its accidental displacement during its movements.

The first operation that the blanks are subjected to in the present instance is that of being bored, and this I preferably accomplish by the employment of two boring-bits entering the blank from opposite ends simultaneously, thereby not only causing a straight hole to be bored, but rendering the operation more certain and expeditious; and the mechanism for carrying this out consists, in the present instance, of two spindles G G, mounted in horizontal bearings $G'$ $G'$ $G'$ $G'$ on opposite sides of the first opening in the guides F F. These spindles are provided with pulleys $G^2$ $G^2$, around which are passed belts running over suitable counter-shafting, adapted to rotate them rapidly in the same direction or in opposite directions, and are capable of a movement toward and from each other in their bearings.

The spindles are kept normally in retracted position by springs $G^4$, encircling them, located between the inner bearing-block and the belt-pulley, a suitable stop being provided for limiting the movement, (see $z$, Figs. 1 and 5,) while on their outer ends are provided adjusting-screws $g'$ $g'$, held in position by lock-nuts $g^2 g^2$, and against the heads of these screws are adapted to strike cams H H, located on shafts I I, extending across the table at right angles to the spindles, for causing the approach of the spindles at stated times. In the inner proximate ends of the spindles are secured the boring-bits $g$ $g$, of any approved construction, arranged in line with each other and adapted to enter the blank held between them from opposite ends almost simultaneously.

Instead of providing the stops for limiting the movement of the spindles caused by the springs, they may be held against the cams normally, if desired.

The shafts I I are mounted in suitable bearings $I'$ $I'$, and are provided, near one end, with gears $I^2$ $I^2$, the latter meshing with pinions $I^3$ $I^3$ on short shafts $I^4$ $I^4$, provided with bevel-wheels $I^5$ $I^5$, meshing with corresponding gears $I^6$ $I^6$ on main driving-shaft $I^7$, provided, also, with belt-wheel $I^8$, to which power is applied to drive the machine. Of course any other form of connection could be applied between these shafts, but that shown is preferred.

The cams that operate on the boring-spindles G G may be set, one slightly in advance of the other, so that the two bits will not be forced toward each other the same distance at the same time, but both will be caused to enter the blank, and then one moving slightly faster, by reason of its advanced cam, will complete its excursion and begin to retreat by reason of its retracting-spring, while the other cam will then move its spindle farther in, completing the boring operation, and as the cams will have ceased to operate on the spindles the springs will retract them to normal position, or, instead, one of the spindles may be slightly the longer.

The distance the boring-bits enter the blanks and the times of entering them can be regulated by the adjusting-screws $g'$ on their outer ends, and also, instead of setting one of the cams in advance of the other, these can be adjusted with one projecting farther than the other, as shown, so as to cause one bit to operate before the other, and the adjustment could probably be better regulated in this way. By employing the two bits instead of one I am enabled to bore a straighter hole and can use much shorter bits, thereby lessening strain and preventing liability of twisting or bending them.

The next operation after the blanks are bored is that of facing them, so as to provide a suitable face for embossing or stamping, and also to true the ends, if they should not happen to have been made true in the first place, and this is accomplished in the present machine by facing-tools $j j$, secured in the inner ends of spindles J J, which latter are mounted in bearings $J'$ $J'$, provided with belt-pulleys $J^2$ $J^2$, retracted by springs $J^3$ $J^3$, provided with adjusting-screw $j'$ and locking-nut $j^2$ on the outer ends and operated by cams $H'$ $H'$ on the shafts I I, in all respects similar to spindles G G, save that they both make their inner excursions simultaneously and rotating cause the facing-tools $j$ to cut and smooth the ends of the blanks held between them. It will be noted that as the blanks come to these facing-tools after having been bored I preferably provide the tools with centers $j^\times$, adapted to enter the holes, and thereby render more certain the true facing of the blanks, as will be readily understood, as it is much easier to center from the inside of a truly-bored spool, and, further, the bore is an absolute and fixed point, from which all operations can be gaged.

Heretofore in the manufacture of spools a difficulty has been experienced in properly shaping the ends of spools and appropriately stamping or embossing them, the former for the reason that if the whole blank were turned down to the spool shape at once there would be liability of chipping the thin ends and the latter because it was impossible in the machines in use to form the heads other than in round shape, such as would be given them in a lathe; but by the instrumentalities about to be described these objections are overcome, and I am enabled to give the ends any desired shape and fit the blank for the subsequent turning operation without liability of chipping the ends, and, further, to at the same time emboss or ornament the head in any desired pattern without liability of splitting or injuring the blank in any way.

While I describe this portion of my invention in connection with the present machine, I do not desire to be understood as attempting to confine its application to this or to any particular form, nor do I wish to be understood as limiting this or any of the instrumentalities herein described to the construction shown, unless specifically mentioned in the claims, as I regard this and others herein mentioned as but one embodiment of the real invention involved.

Extending parallel with the spindles carrying the boring and facing tools are two spindles K K, mounted in bearings K' K' and located on opposite sides of the blank-carrier, provided with encircling springs K² K², the inner ends of which abut against the inner bearings or equivalent stops, while their outer ends are secured to said spindles or abut against a suitable collar or stop secured thereto, operating to force said spindles outward and hold their outer ends against the cams; or a suitable stop may be provided for limiting the outward movement—such, for instance, as the collar against which the spring abuts striking the outer bearing, as will be readily understood.

The outer ends of the spindles are provided with the adjusting-screw $k'$ and nut $k^2$, and against the former are adapted to operate the cams H² in the shafts I, as described, with regard to the other spindles. These spindles are preferably secured from rotation by any suitable means, and in the construction indicated in Fig. 6 their outer ends are reduced slightly and provided with a projecting center 1, adapted to enter the hole in the spool-blank, and on the reduced portion is located an annular die 2—preferably of steel—and provided on its outer face with any suitable design, either in relief or intaglio, the reverse of which it is desired to impress upon the spool. The dies on the opposite co-operating-spindle may be the same, if desired; but I prefer to make them different, as indicated in Figs. 8 and 9. Surrounding these dies are provided annular cutters or knives 3, with their inner edges parallel with the spindle, and their outer sides tapered down to a sharp edge. By the employment of the straight edges inside the cutters and the embossing-dies therein, I am enabled to simultaneously cut and stamp the spool ends without liability of splitting or of causing the wood to be so spread as to prevent withdrawal, as would be the case if the inside were tapered to correspond with the outside. The cutting-edges are here made corrugated, as shown in Fig. 7, though they may be made plain or of any shape in which it is desired to cut the spool ends. The cutters and dies may be secured in position by means of the set-screw 4 shown, or in any other suitable manner.

The cams H² H² on shafts I I are arranged to operate upon the rear ends of the spindles to cause them to approach and act upon the blank between them, similar to the other devices described; but it will further be noted that these cams have upon their surfaces projections $h\ h$, that are adapted to come in contact with the spindle ends after a portion of their inward movement has taken place.

The operation of these devices is as follows: When the blanks are in position, the cams move the spindles toward each other, the knives cutting into the ends a short distance slightly greater than the thickness of the ends when the body is turned down, as is shown clearly in Fig. 8, and just before the knives reach their extreme inner position the projections $h\ h$ on the cams strike the spindles, and at this point the embossing or stamping dies are brought in contact with the smooth faces of the blank and a quick hard stroke is given them, causing the surfaces to be stamped or embossed into the desired shape. It will be noted that, in the first place, by the cutting operation any desired shape is given the ends and they are formed by a longitudinal cut that extends back far enough, so that when the spool is turned down there will be no liability of chipping them, and, further, that at the time of the embossing of the blank faces the blank ends are within the hollow cutters, holding the wood and effectually preventing its spreading or the blank being split by the sudden blow. After the cams have passed out of contact with the spindles their springs return them to first position. It will be noted also that there is a portion of the blank end, indicated by 6 in Fig. 9, that is unaffected by the dies and is left in its normal soft state to be further acted upon, as hereinafter described.

Next the cutting and embossing mechanisms are provided the devices for finishing the spool by turning it down to the required size and shape, and, if desired, further marking the ends on the portion of the wood inside the part acted upon by embossing-dies, so to speak, to avoid liability of breaking them off. The mechanism which I employ for this purpose in this instance consists of two spindles L L, supported in suitable bearings L' L', provided with the belt-pulleys $L^2 L^2$ encircling springs $L^3 L^3$, and on the outer ends with adjusting screws and nuts $l'$ $l^2$, all preferably substantially the same as described with reference to the boring-tool spindles. The inner proximate ends of these spindles L L are provided with centers 1, consisting, as shown in Fig. 10, of a projecting centering projection $l^3$, and on one end or both sides thereof with suitable letters or characters in relief, adapted when the two spindles are brought together forcibly with the spool-blank between them (by the operation of cams $H^3 H^3$ on shaft I I on their outer ends, all as previously described with reference to the boring and facing devices) to sink said dies into the portion of the wood represented by 6 in Fig. 9, and then instead of being withdrawn immediately they are permitted to remain in the ends and serve as the centers for rotating the blank while the turning-tools operate upon it to give it its final shape; or, if desired, ordinary centers may be employed instead. These tools can be brought in contact with the spool-blank by any suitable mechanism while it is held and rotated; but I prefer the construction shown, which consists, essentially, of a carriage N, sliding in suitable guides, the reciprocating movements being caused, for instance, by a lever P, pivoted in a bracket P', connected at its upper end to said carriage by a link $P^2$ and having its lower end in engagement with a cam Q on shaft E, operating the blank-feeding apparatus and normally held in engagement therewith by means of a weight $P^3$, connected by a cord with the lever, said weight also performing the function of returning the carriage to first position, or a spring may be employed for the same purpose; or, further, the lever might be strapped to the cam, so that the latter could positively operate it in both directions.

The operation of this portion will of course be readily understood. The cam operates in the end of the lever to draw the carriage inward, while the weight or equivalent device moves it outward again when the smaller portion of the cam is reached. The carriage for the tool is supported upon the block N', provided with an adjusting-screw $n$ for limiting its outward movement, which block is in turn mounted on transverse ways in block $N^2$, and is capable of adjustment thereon, by screw $n'$, at right angles to the line of movement of the tool-carrier, thus providing for placing the tool in correct position. The carrier N is inclined outwardly on its upper portion, forming a rest for the tool or tools, which are held in position by a series of bolts $N^3$, passing through the plate $N^4$, the latter being in turn bolted to the carrier. The end of the tool projects beyond the carrier, as shown, and instead of the securing means described any that will answer the purpose could be employed.

The universal adjustment just described is provided for the purpose of allowing the tool or tools to be moved into desired position regarding the blank, in order that it may be accurately cut when rotated. Either a single tool may be employed or a number, as is required. Any other form of holding and reciprocating device can be employed to answer the purpose.

As stated, the blank-carrying device moves over the table, presenting the blanks in position to be operated upon by the various devices, and it is desirable that some means be provided for securely holding the blanks stationary while being operated upon by the various tools, so as to prevent their displacement and imperfect operation, though perhaps not essential, and this I provide one form of in the present machine, as follows:

R R R R represent four standards extending from the way B, two on opposite sides the path traversed by the blank-carrier, connected preferably at their upper ends by a plate R', upon which rests a bearing $R^2$ for shaft I', carrying the belt-pulley, as described, and these standards further serve as guides for plates S, provided with either perforations or notches at the corners for their accommodation. Surrounding each of the standards and connected at the upper end with the plate or standard are spiral springs S' S', their lower ends being connected with plate S, and their tendency being to lift said plate upward against a cam T', secured to a rotating shaft T, mounted in suitable bearings at opposite ends of the machine. This shaft is provided at one end with a gear $T^2$, receiving motion, through idlers $T^3 T^3$, from gear $T^4$ on the main driving-shaft, and at the other with a bevel-pinion $T^5$, meshing with a corresponding pinion $T^6$ on the upper end of a short vertical shaft, gearing in a similar manner with the shaft E and imparting motion thereto. The gearing from the main shaft to shaft T, it will be noted, is so proportioned that the latter will be given a relatively slow motion.

Upon the presser bar or plate S, and directly in line with and above the place occupied by the blanks being operated upon by the boring, facing, and cutting and embossing tools, are located blocks U U' $U^2$, the two latter being mounted upon screws $u$ $u$, passing through the plate, so that by the manipulation of the screws the blocks can be adjusted so as to project a greater or lesser distance below the bar, as desired, and thus hold larger or smaller blanks. Suitable guiding-pins or guides of any construction may be employed for the blocks, and the central block may or may not be adjustable, as desired.

The general construction of the devices having been described, the following description of the operation of the parts will give a clear understanding of the invention. It will be noted, by way of introduction to the operation, that in the present machine the devices for performing the various operations are located with their centers an equal distance apart—that is, from the center of the boring-bits to the center of the facing-tools is the same distance as from this center to that of the cutting and embossing dies and from the latter to the centers of the rotating heads carrying the spool; and, further, that the links of the chain constituting a carrier are so shaped and connected relatively to each other that the distance between them is either equal to or a multiple of that between the tool-centers, and the distance of the feed of the carrier forward by the mechanism shown is equal to the distance between two blanks, the whole being so arranged that the movement of the carrier forward will bring the blanks into position to be operated upon by the appropriate tools in whose path they are located, and the next movement forward will carry the blank that has just been turned out of engagement with the machine and permit of its removal a finished spool, while the last blank fed will be engaged by the boring-bits, and those previously operated upon intermediate the two will be advanced one step, in the present instance two blanks standing between the tools, but this latter is not essential, except for convenience of arrangement, as any other arrangement of mechanism arranged to feed blanks from one mechanism to another to further act upon them may be employed. At the end of the way B (represented by letter X) the spool-blanks, consisting, preferably, of small cylindrical blocks of wood—though other suitable material might be employed, as fiber, for instance—are fed to the machine and placed in the notches in the carrying-links $c$ $c$ of the carrier, the prongs of the latter preventing displacement. These may be either supplied by hand or fed from a suitably-arranged hopper, and caused to fall crosswise of the links with their ends projecting beyond them, and prevented by the guide-flanges F from accidental displacement. Starting with the carrier supplied with blanks, the first one of the series being between the rotatable spindles L L, and motion being imparted to the main shaft $I^7$ and to the pulleys $G^2$, $J^2$, and $L^2$ from countershafting above, as described, the shaft T is rotated and shafts I I are rotated simultaneously through the connections described, but just before their cams operate upon the spindles to force them together to operate upon the blanks between them the cam T' on shaft T forces down presser-plate S, with the blocks U thereon, in contact with the blanks, securely holding them against the carrier-links, as explained, and as this shaft is a slowly-moving one, and the cam of considerable length, the clamps will hold the blanks until the operations are finished. As soon as the clamps operate, the cams H H on shafts I I force the spindles inward simultaneously, one of the boring-spindles moving slightly in advance of the other, as described, the result being that the spool between the bits is bored, as described, that between the facing-tools previously bored is faced, and that between the cutting and embossing spindles, and previously bored and faced, is cut by the annular cutters and embossed on the ends, while the spindles L L swiftly rotate the blank previously bored, faced, cut, and embossed, the centers when brought together having sunk the desired figures in the ends of the blank, as described. During the time the centers L L are preparing to rotate and are rotating the blank between them the cam Q on shaft E is operating upon the lever P, and through link $P^2$ driving the carriage N forward toward the blank, so that by the time the blank is rotating, the tool T is held in engagement with it and the continued movement of the cam draws in the tool, cutting the spool into shape, and, by reason of the longitudinal cuts previously made in the blank, without liability of splitting the ends, and when the apex of the cam is reached and the turning operation finished the weight $P^3$ draws on the lever and moves the tool-carriage outward again to first position. By this time all the cams on shafts I I have moved out of engagement with the ends of the spindles and cam T' has moved out of engagement with the presser-plate, allowing the springs S' S' to raise the same and disengage the blanks, and now the cam E' operates upon the sprocket-wheel D through frame, pitman, lever, and pawl, previously described, to turn the same and move the carrier forward a distance equal to one link or carrying projection, by which movement the completed spool, resting in the carrying-link beneath the centers 1 1, will be allowed to drop off when the carrier turns over the guide-wheel C', or to be removed in any suitable manner, the blank in the carrier-section next said centers to be moved forward to be grasped by them on the next operation, the blank cut and embossed by the last operation moved forward one step, and so on to the boring-spindles, when a new blank is fed in position to be operated upon by this mechanism. By the time this feeding operation is over the presser-cam T' again operates the presser and cams H, the various spindles causing a repetition of the operations just described on the spool-blanks held in position.

By the employment of the carrier having pockets for the blanks, with inclined sides in connection with the adjustable way on which the carrier operates, I am enabled to operate on blanks of various sizes and have their centers always in line with the tool-centers simply by adjusting the way vertically. As before stated, the blanks will be held with their centers in line with the center of the carrier-sections by the inclined prongs, and therefore just in line with the tool-centers, so that adjustment of the way vertically will bring the blank centers in line with the tools, no matter what their diameter.

It will be understood that these operations are smoothly and continuously accomplished, and the machine turns out finished spools, requiring nothing save boxing to fit them for market.

Various modifications of the various separate mechanisms and their arrangement relatively to the other parts of the machine can be devised without departing from my invention, and I do not desire to be understood as confining myself to the details shown.

Having thus described my invention, what I claim as new is—

1. In a spool-machine, the combination, with a straightway and a continuous carrier moving intermittingly thereon, having pockets in which the blanks are contained during the operations, of a series of co-operating pairs of tools operating successively upon the blanks and each arranged to perform one step in the operation of spool-making, the members of each pair being arranged on opposite sides of said way and engaging the same blank simultaneously, connections between all of said tools, and a suitable driving mechanism causing them to retreat and advance simultaneously and between the carrier and driving mechanism for causing the feed while the tools are separated, substantially as described.

2. In a spool-machine, the combination, with the straight way or guide, a continuous carrier moving intermittingly thereon, having pockets in which the blanks are contained during the operations, of a series of co-operating pairs of tools operating successively upon the blanks and each arranged to perform one step in the operation of spool-making, the members of each pair being arranged on opposite sides of the way and operating simultaneously upon the same blank, devices—such as cams—for causing the simultaneous approach and permitting the separation of the tools, a presser for holding the blanks rigidly upon the carrier while being operated upon by the series of pairs of tools, and connections between the carrier and driving mechanism, the tool-operating devices, and the presser, whereby the blanks will be fed only while the tools are retracted, substantially as described.

3. The combination, with the straight way or guide and a continuous blank-carrier having pockets in which the blanks are contained during the operations, of a series of co-operating pairs of tools, each pair constructed to perform a single step in the operation of making spools and the members of each pair arranged on opposite sides of the way to operate simultaneously on the ends of the blanks between them, devices—such as cams—for causing the simultaneous approach of the members of all the pairs and permitting their operation, a presser for holding all the blanks being operated on by said pairs of tools stationary upon the carrier, intermittingly-operating mechanism for moving the carrier forward, and connections between the last-mentioned devices, the presser, and the tool-projecting mechanism, whereby the carrier will be moved forward while the tools are retracted and the presser removed, substantially as described.

4. In a spool-machine, the combination, with the blank-carrier, of the series of pairs of co-operating tools for successively operating upon the ends of the blanks, the members of each pair being located on opposite sides of the carrier, said series comprising a pair of boring-bits, a pair of reciprocating circumferential cutting-dies for shaping the ends of the blanks circumferentially, and a pair of blank-holding centers, devices—such as cams—for causing the simultaneous approach and permitting the separation of the tools, intermittingly-operating mechanism for feeding the carrier forward past the tools in the order named and while they are separated, a presser operating upon the blanks located between the boring-bits, and cutting-dies for holding the blanks stationary while being acted upon, and connections between the carrier-operating mechanism, the presser, and the tool-projecting devices, whereby the presser will be operated and the tools caused to approach and operate upon the blanks between them while the carrier is stationary and the presser in engagement with the blanks, substantially as described.

5. In a spool-machine, the combination of the straight way or guide, the continuous flexible carrier moving thereon, the series of pairs of co-operating tools for operating upon the ends of the blanks, the members of each pair being located on opposite sides of the carrier, said series comprising a pair of boring-bits, a pair of cutting and circumferential embossing-dies for shaping the ends of the blank circumferentially and embossing it, and a pair of blank-holding centers having a centering-pin and suitable characters in relief for entering the blank and rotating it, devices—such as cams—for causing the approach and permitting the separation of the tools, and intermittingly-operating mechanism for feeding the carrier forward past the tools in the order named, substantially as described.

6. In a spool-machine, the combination of the straight guide or way, the continuous flexible blank-carrier moving therein, the series of co-operating tools for operating upon the ends of the blanks on the carrier, the members of each pair being located on opposite sides of the carrier, said series comprising a pair of blank boring-bits, a pair of circumferential cutting-dies for shaping the ends of the spool circumferentially, and a pair of blank-holding centers, devices—such as cams—for causing the approach and permitting the separation of the tools, a presser operating upon the blank located between the boring-bits and cutting-dies, a carriage supporting a turning-tool and movable toward and from the blank held between the blank-holding centers, and a connection between the various parts whereby the members of the pairs of tools are caused to approach to operate upon the blanks on the carrier between them, the presser holds its blank, and the turning-tool is brought forward to operate upon the blank between the centers while the carrier is stationary, and all said tools are in retracted position while the carrier moves forward, substantially as described.

7. The combination of the straight way or guide, the continuous blank-carrier moving therein, the series of pairs of co-operating tools for operating upon the ends of the blanks, the members of each pair being located on opposite sides of the carrier, said series comprising a pair of boring-bits, a pair of blank facing-tools, a pair of circumferential cutting and embossing dies, and a pair of blank-holding centers, connections for rotating the bits, facing-tools, and holding-centers, devices—such as cams—for causing the approach and permitting the separation of the tools, intermittingly-operating mechanism for feeding the carrier forward past the tools in the order named, a carriage carrying a turning-tool, a presser operating upon the blanks located between the bits, the facing-tools, and the cutting-dies, and connections between the parts whereby when the carrier is stationary the presser will hold the blank, the tools of the series will be caused to approach and operate upon the blanks between them, the turning-tool moved forward to operate on the blank between the centers, and all said parts will return to normal position, when the carrier will move forward and present a new blank to be operated upon by each of the tools, substantially as described.

8. In a spool-machine, the combination, with a blank-carrier, of a series of tools operating upon blanks carried by said carrier in succession, comprising a pair of boring-bits entering the blanks from opposite ends, a pair of cutting-dies, arranged to shape the spool ends, a pair of turning-centers, two shafts at right angles to the spindles, having the series of cams thereon operating on opposite spindles for causing the simultaneous approach, set-screws regulating the extent of such approach, and a reciprocating turning-tool, substantially as described.

9. In a spool-machine, the combination, with the horizontally-moving blank-carrier, of the series of pairs of co-operating tools arranged with the members of each pair on opposite sides of the carrier, mechanism, substantially as described, for causing the feed of the carrier intermittingly, a presser-plate moving on vertical ways above and at right angles to the carrier and adapted to rest upon one or more blanks on the carrier and hold them while being operated upon by the tools, and a cam for causing the operation of said plate, substantially as described.

10. In a spool-machine, the combination, with the blank-carrier, of a series of pairs of co-operating tools arranged with the members of each pair on opposite sides of the carrier, mechanism, substantially as described, for causing the feed of the carrier intermittingly, and a plate moving on vertical ways above the carrier, carrying one or more adjustable presser-feet adapted to rest upon one or more blanks on the carrier and hold them while being operated upon, a cam for causing its operation, and a spring for returning said plate to normal position, substantially as described.

11. In a spool-machine, the combination, with a pair of annular cutters for operating on opposite ends of the blank to give the proper circumferential shape thereto, of embossing-dies within said cutters for embossing the end of the spool while being cut, substantially as described.

12. In a spool-machine, the combination, with the pair of annular cutters operating to shape the ends of the spool-blank, of the dies contained within them, their operating-faces being substantially parallel with and below the plane of their cutting-edges, and the cams for causing the gradual approach of the cutters and dies, the cams being provided with the projections thereon for causing the sudden forward movement of the dies, substantially as described.

13. The combination of the spindle, the centering-pin, the removable embossing-die, the removable annular cutter extending beyond the die, and the screw or similar device passing through both center and die for holding the die and cutter in position on the spindle, substantially as described.

14. In a spool-machine, the combination of the main frame, a longitudinally-movable blank-carrier, and mechanism for moving it intermittingly, of a series of pairs of operating-tools located on the main frame and on opposite sides of the carrier, a stationary way or support on which the carrier runs, a presser for holding the blanks on the carrier connected to the way, means, substantially as described, for operating it when the carrier is stationary, and means, substantially as described, for adjusting the way on the frame toward the tools, substantially as described.

15. In a spool-machine, the combination, with the series of pairs of co-operating tools for operating upon the blanks in succession and shaping their ends, of a continuous carrier arranged between the tools, having pockets with the inclined sides, the bisector of the angles formed by the sides intersecting at right angles the tool-centers, and means for adjusting said carrier at right angles with said centers, whereby blanks of different sizes may be operated upon by adjusting said carrier, substantially as described.

EMERSON P. BROWNELL.

Witnesses:
A. N. THOMPSON,
I. W. JUDD.